United States Patent
Safin et al.

(10) Patent No.: US 11,698,282 B2
(45) Date of Patent: Jul. 11, 2023

(54) TIME DOMAIN REFLECTOMETRY LIQUID LEVEL SENSING FOR LAUNCH VEHICLES

(71) Applicant: ABL Space Systems, El Segundo, CA (US)

(72) Inventors: Kirill Vladimir Safin, Los Angeles, CA (US); Roy Cohen, Los Angeles, CA (US); Constantinos Emmanuel Gerontis, Danvers, MA (US)

(73) Assignee: ABL SPACE SYSTEMS, El Segundo, CA (US)

( * ) Notice: Subject to any disclaimer, the term of this patent is extended or adjusted under 35 U.S.C. 154(b) by 352 days.

(21) Appl. No.: 16/987,623

(22) Filed: Aug. 7, 2020

(65) Prior Publication Data

US 2021/0116286 A1   Apr. 22, 2021

Related U.S. Application Data

(60) Provisional application No. 62/885,080, filed on Aug. 9, 2019.

(51) Int. Cl.
*G01F 23/284* (2006.01)
*G01F 23/24* (2006.01)

(52) U.S. Cl.
CPC ............ *G01F 23/24* (2013.01); *G01F 23/284* (2013.01)

(58) Field of Classification Search
CPC ........ G01F 23/28; G01F 23/284; G01F 25/20; G01F 25/24
See application file for complete search history.

(56) References Cited

U.S. PATENT DOCUMENTS

| 2012/0137767 A1 * | 6/2012 | Silvermint ............ G01F 23/284 73/290 R |
| 2016/0003662 A1 | 1/2016 | Dayal |
| 2017/0038240 A1 * | 2/2017 | Honeck .................. G01F 23/284 |
| 2019/0310125 A1 * | 10/2019 | Farmanyan ............ G01S 13/106 |
| 2019/0369209 A1 * | 12/2019 | Vermeulen ................ G01S 7/40 |
| 2020/0217706 A1 * | 7/2020 | Wildey ..................... G01S 13/00 |

FOREIGN PATENT DOCUMENTS

| DE | 102005044143 A1 * | 3/2007 | ........... G01F 23/284 |
| EP | 1524506 A2 | 4/2005 | |
| WO | 98/24013 A2 | 6/1998 | |

OTHER PUBLICATIONS

International Search Report and Written Opinion issued in PCT Application No. PCT/US2020/045537 dated Oct. 30, 2020.

* cited by examiner

*Primary Examiner* — Herbert K Roberts
(74) *Attorney, Agent, or Firm* — Hogan Lovells US LLP

(57) ABSTRACT

A system for determining a fluid level includes a front end and a measurement probe. The measurement probe receives a pulse from the front end and returns a partially reflected pulse and a fully reflected pulse to the front end. The partially reflected pulse is evaluated to determine a liquid level within a tank that includes the measurement probe. The measurement probe includes a conductive trace configuration to provide a time delay to prevent pulse build up.

20 Claims, 8 Drawing Sheets

TIME DOMAIN REFLECTOMETRY LIQUID LEVEL SENSING FOR LAUNCH VEHICLES

CROSS REFERENCE TO RELATED APPLICATIONS

This application claims priority to and the benefit of co-pending U.S. Provisional Application Ser. No. 62/885,080 filed Aug. 9, 2019 titled "TIME DOMAIN REFLECTOMETRY LIQUID LEVEL SENSING FOR LAUNCH VEHICLES", the full disclosure of which is hereby incorporated herein by reference in its entirety for all purposes.

BACKGROUND

Measuring a liquid propellant in a launch vehicle enables characterization of onboard propellant levels both during ground operations and in flight. Understanding the amount of propellant on the vehicle enables proper mixture ratio control, propellant loading, and accurate engine shutoff. Typically, liquid propellant levels in launch vehicles are determined using a system that measures the difference in pressure or temperature at discrete points along the interior of the propellant tank. As a result, liquid levels between these points may be estimated, which is undesirable when working with launch vehicles. Moreover, other level sensing techniques may be unsuitable for the harsh operating conditions of launch vehicles.

BRIEF DESCRIPTION OF THE DRAWINGS

Various embodiments in accordance with the present disclosure will be described with reference to the drawings, in which.

DETAILED DESCRIPTION

Figure 1:
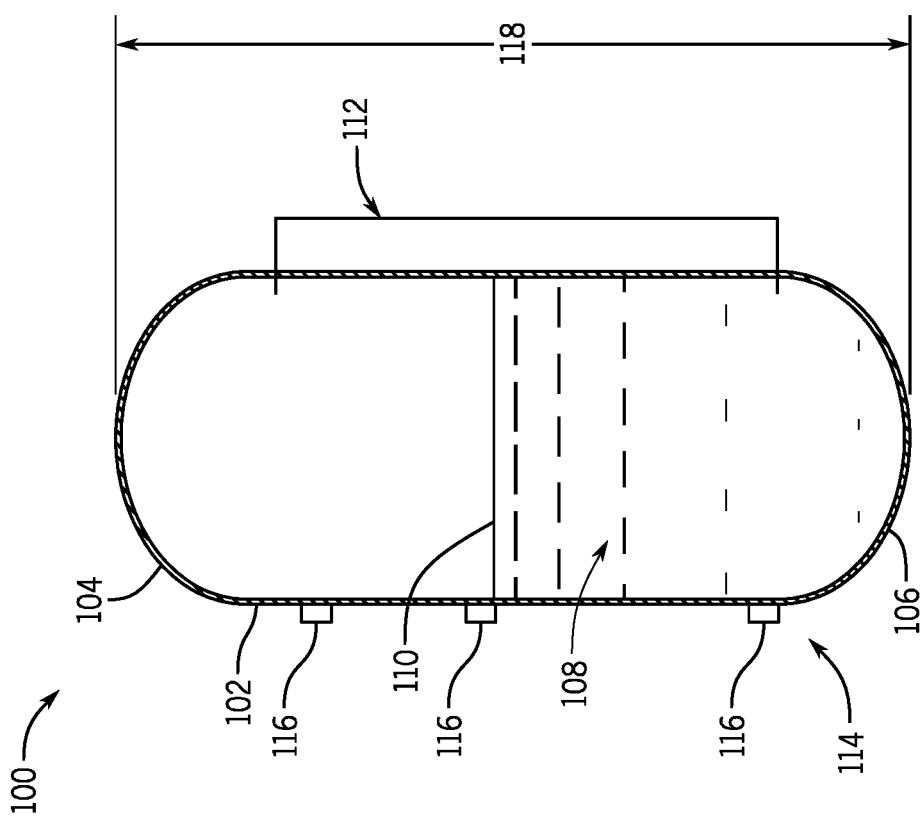
FIG. 1 is a schematic diagram of an embodiment of a fuel tank and measurement systems.

Systems and methods in accordance with various embodiments of the present disclosure may overcome one or more of the aforementioned and other deficiencies experienced in conventional approaches for liquid level sensing, such as liquid level sensing for launch vehicles.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", "other embodiments", or "various embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Furthermore, when describing certain features that may be duplicative between multiple items, the features may be designated with similar reference numerals followed by a corresponding identifier, such as "A" or "B".

In various embodiments, systems and methods of the present disclosure include a level sensing system showing a front end electronics package and a flexible level sensing probe. In various embodiments, the front end electronics package may be an analog or digital package and may include electronics and circuitry to inject pulses into the probe, measure reflections from the probe, convert the reflections into time-of-flight measurements, determine a tank level, and/or communicate with vehicle systems. In various embodiments, the level sensing probe is positioned to run along the side of a propellant tank, where it is in contact with the liquid propellant, and carries a high-speed pulse that is reflected by the surface of the liquid. In other words, embodiments of the present disclosure provide a wetted detector that makes direct contact with the fluid being measured and, in certain embodiments, may be anchored within the tank and/or may be positioned along an inner surface of the tank.

In various embodiments, the front end includes electronics and circuitry that enable production and transmission of a high-speed pulse into a probe, receiving and/or recording pulses (e.g., signals, reflections) from the probe, calculating time-of-flight measurements, and communicating results to other vehicle systems, which may then utilize the information to adjust one or more operational components of the vehicle. In various embodiments, the front end may generate and/or transmit a high-speed electrical pulse, but may also be configured to use optical pulse s, ultrasonic pulse s, or any other reasonable type of pulse/signal. Furthermore, it should be appreciated that while various embodiments may use time-of-flight measurements, other embodiments may incorporate and/or utilize pulse amplitude, pulse width, or other properties of the pulse. In certain embodiments, the front end may include one or more connectors to receive and/or transmit information from other devices, but it should be appreciated that various embodiments may restrict and/or limit the information that is received and/or transmitted from the front end. For example, the front end may be positioned to only receive an input, only transmit an output, or any reasonable combination. The front end may be powered by a variety of different voltage levels, by way of example 28 V, but it should be appreciated that the systems and methods of the present disclosure may be adjusted in order to adapt to power availability from one or more batteries or from components of the vehicle system. As noted above, embodiments of the present disclosure provide for direct contact between the probe and the liquid being measured, and it should be appreciated that the front end may or may not also be in contact with the liquid. Furthermore, while embodiments may be described where a single front end is associated with a single sensor, it should be appreciated that a front end may be coupled to and/or associated with multiple different probes, which may be liquid sensing probes or other types of probes, and may utilize information from the other probes in order to aggregate or otherwise adjustment measurement information to improve accuracy, among other benefits.

In various embodiments, the sensing probe carries a pulse, such as an electrical pulse received from the front end, along its length. As noted above, the sensing probe is positioned into contact with the liquid being sensed. The point of contact at which the probe contacts the liquid surface will produce a reflected pulse that is returned, along the probe, to the front end. In various embodiments, the sensing probe includes a conductive material, such as copper, aluminum, or the like, to form a trace that is at least partially submerged in the liquid. It should be appreciated that while embodiments are described in which the probe contacts the liquid, other embodiments may position the probe such that it does not contact the liquid. Certain embodiments are configured to provide a continuous range of measurements, such as a probe that extends substantially along an entire length of the tank, but other embodiments can also use the probe at discrete sensing locations or for particularly selected ranges. As noted above, the conductive material of the probe may be flexible or rigid, and as will be described below, may include a variety of different thicknesses or form factors based on one or more design or operating conditions. Furthermore, discussion of liquid level sensing is for illustrative purposes only and the probe may also be used for gas, solid, or combination (e.g., slurry) level measurements. As will be described in more details below, the probe may be formed on a variety of carriers, such as a rigid or flexible printed circuit board. Materials of construction may be particularly selected to enable compatibility with a variety of different fluids, such as liquid oxygen, Jet-A (kerosene), gaseous nitrogen, gaseous helium, or any other liquid, gas, or multiphase fluid, which may also include cryogenic, hazardous, and/or toxic fluids. As noted above, multiple probes may be utilized in various embodiments.

FIG. 1 is a schematic diagram of a tank (e.g., propellant tank) 100 that may be utilized with various launch vehicles. It should be appreciated that while embodiments of the present disclosure may discuss use with launch vehicles, it should be appreciated that in other embodiments various other liquid, gas, solid, or combinations thereof storage contains may also benefit from embodiments of the present disclosure. The illustrated tank 100 includes an elongated body portion 102 and end caps 104, 106, which may be dome-shaped or elliptical. It should be appreciated that various features have been removed for simplicity, such as inlet and outlet nozzles, ports for sensors, and the like. The illustrated tank 100 has a fluid 108 (e.g., gas, liquid, solid, or a combination thereof), arranged within an interior of the tank, which may be a propellant as described above for use with a launch vehicle. Vehicle operators, control computers, and support personnel may desire to know a level 110 of the fluid 108 to determine whether a refueling is needed, whether to adjust operation, or the like. Traditional methods for determining a liquid level are illustrated on the tank 100, which include a sight glass 112 and a discrete sensing system 114. The illustrated sight glass 112 may include a body portion that has a window that allows for a visual indication of the level 110. Additionally, the sight glass 112 may be modified to include a floating ball or a magnetic sensing system, which may be electronically coupled to a controller or the like. Similarly, the discrete sensing system 114 may include sensors 116 along different portions of a length 118 of the tank 100 to provide information regarding the level 110. Both of these systems have problems that may be overcome by embodiments of the present disclosure. For example, for tanks that are very large sight glasses are impractical. Moreover, visual inspection is not useful during operation of a launch vehicle, which may be subject to harsh conditions (e.g., high temperatures, high speeds, low oxygen environments, etc.). Similarly, discrete measurements may not provide sufficient information to make operational decisions and may be too costly to provide enough discrete sensors to provide a desired level of precision.

As will be described in detail below, embodiments of the present disclosure are directed to a level sensing system that may provide a continuous level sensing using time domain reflectometry. Embodiments of the system may include a front end coupled to a probe that is arranged within an interior of the tank. The probe may transmit a pulse (e.g., signal), such as an electrical pulse, along a length of the probe. Upon contact with the fluid, a portion of the pulse may be reflected back to the front end, which may record the time that the pulse is received to determine the level of the fluid.

Figure 2:
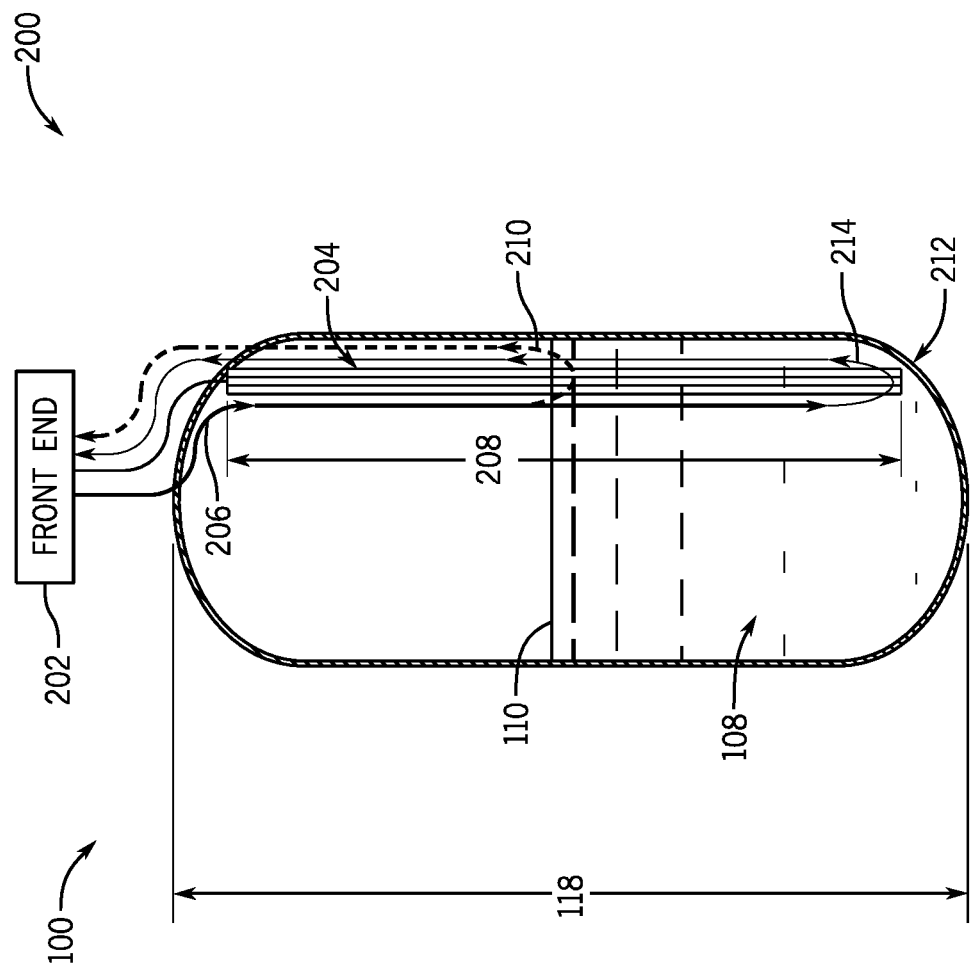
FIG. 2 is a schematic diagram of an embodiment of a fuel tank including a level sensing system, in accordance with embodiments of the present disclosure.

FIG. 2 is a schematic diagram of the tank 100 including a level sensing system 200. The illustrated level sensing system 200, as will be described in detail below, includes a front end 202 (e.g., control system, controller, etc.) and a probe 204, which may be a flexible probe in various embodiments. In this embodiment, the probe 204 extends along substantially the length 118 of the tank 100 and at least a portion of the probe 204 is submerged within the fluid 108.

FIG. 2 further illustrates a schematic representation of the time domain reflectometry that may be used to determine the level 110. In the illustrated embodiment, the front end 202 is coupled to the probe 204 and transmits a signal 206 (e.g., pulse) to the probe 204. As shown, the signal 206 travels in a downward direction (relative to the plane of the page) toward the level 110 along a probe length 208. Upon reaching the level 110, a reflected signal 210 (e.g. partial pulse, reflected partial pulse) is returned, along the probe 204 to the front end 202. Additionally, the remaining energy from the signal 206 reaches an end 212 of the probe 204 and returns to the front end 202, along the probe 204, as a fully reflected signal 214 (e.g., fully reflected pulse). As will be described, the time for the receipt of the reflected signal 208 may be utilized to determine the level 110. For example, a faster return of the reflected signal 208 would indicate a higher level 110 in the configuration shown in FIG. 2.

Figure 3:
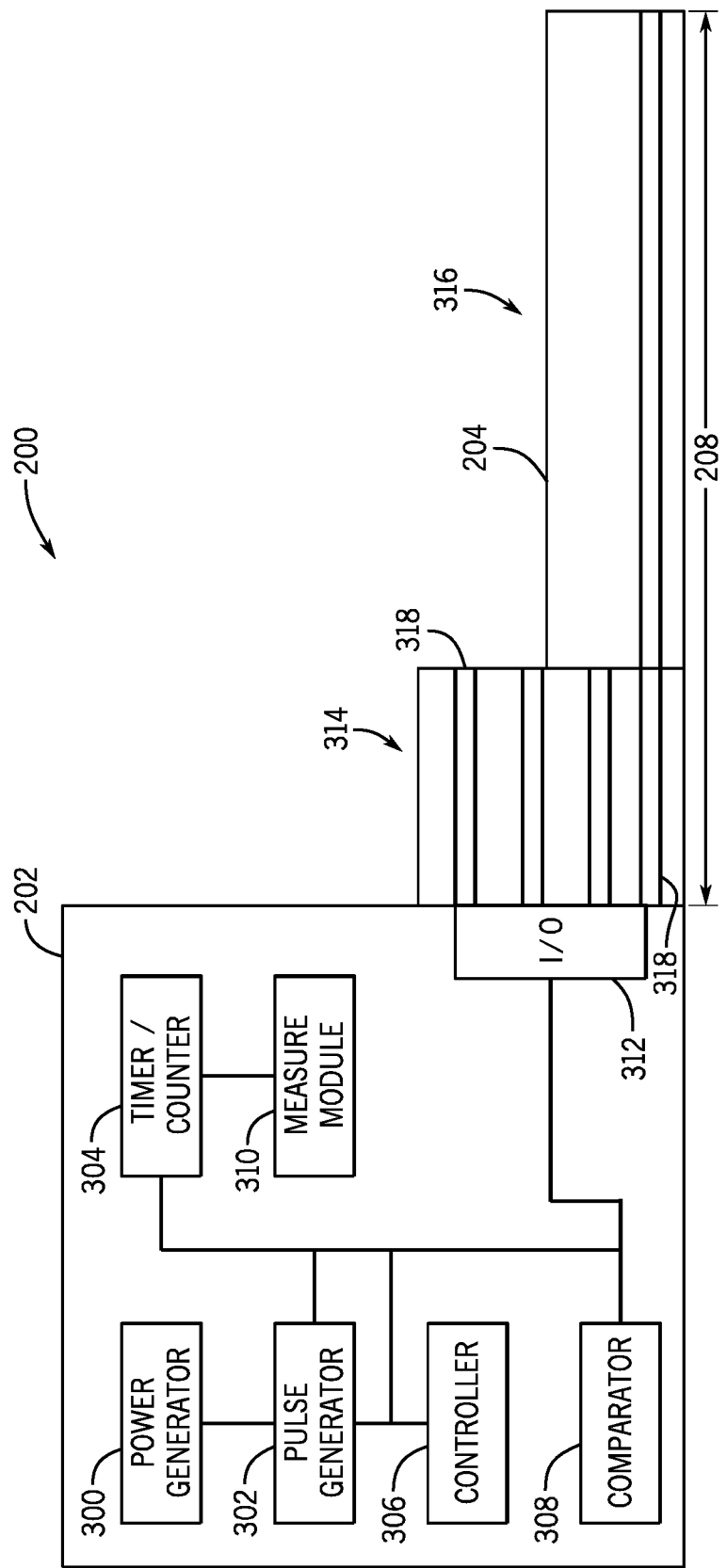
FIG. 3 is a schematic diagram of an embodiment of a probe, in accordance with embodiments of the present disclosure.

FIG. 3 is a schematic diagram of an embodiment of the level sensing system 200 illustrating components of the front end 202 and the probe 204. As noted above, the front end 202 may include various electronics and circuitry for generating the signal (e.g., pulse), evaluating the return signal, and the like. The illustrated front end 202 is also coupled to the probe 204, which as shown, extends for the probe length 208, which may be particularly selected based on a variety of factors, such as the tank length. Furthermore, as will be described, features of the probe 204 may effectively increase a probe length, for example, by adding multiple pathways or traces along the length to increase a distance for the signal to travel.

In the illustrated embodiment, the front end 202 includes a power generator 300 (e.g., power system, power supply). The power generator 300 provides the requisite power (e.g., voltage) for system operations, but it should be appreciated in other embodiments that power may be provided from the vehicle system, a battery, or the like. In various embodiments, the system may operate between 12V and 3.3V for various different components of the front end 202. As noted above, the power generator may be operable at approximately 28V and may include one or more low-dropout regulators (not pictured).

In operation, a pulse generator 302 outputs the signal utilize to detect the level within the tank. The signal may be a high frequency, high voltage pulse. In various embodiments, the pulse is a square wave, however, different waveforms may also be utilized with systems and methods of the present disclosure. It should be appreciated that a higher voltage may be desirable (e.g., approximately 10-20V) because subsequent reflections may be easier to identify and/or may provide for improved thresholds (e.g., triggers). By way of example, for a 12V input where a reflected signal returns 25% of the energy, the reflected signal is approximately 3V (not accounting for resistance in the lines and the like). This voltage may be easier to detect than a 1V input where 25% of the energy reflected back is approximately 250 mV. Furthermore, noise may be more visible and/or intrusive at lower voltage levels. In certain embodiments, the pulse generator 302 may be formed by a 100 pF tank capacitor, a large (e.g., 100 k) leak capacitor, and a high-pass filter (HPF). In operation, a field-effect transistor (FET) switches the capacitor to ground when charged.

As will be described below, embodiments of the present disclosure may incorporate one or more features to overcome potential problems with traditional power supplies with respect to reflected signals. For example, producing fast signals with high voltages may be cost prohibitive or difficult. While slow signals with high voltages are easier and cheaper to produce, their duration may lead to full reflections that destroy an initial partial reflection. As a result, the identification of the partial reflection, which corresponds to the level, may be lost. Embodiments of the present disclosure may incorporate one or more features, such as a launch zone and/or an elongated probe in order to reduce the likelihood of signal interference, thereby enabling use of cheaper pulse generators.

Further illustrated is a timer 304 that may be used to measure a difference between a transmission time (e.g., a first time) and a receipt time (e.g., a second time) for a signal. In certain embodiments, the timer 304 may measure a time between a start pulse until one or more stop pulses are received. In certain embodiments, the difference between the start and stop time may be very small, and as a result, high resolution timers may be utilized with embodiments of the present disclosure. By way of example only, a 64-bit timer with a resolution of 55 ps and a range of 12 ns to 500 ns may be utilized to provide accurate measurements of time between a pulse being transmitted and a reflected pulse being received.

In various embodiments, the front end 202 also includes a controller 306, which may include an RF switch to permit switching the pulse transmission. As will be described below, various operations of the system 200 may be toggled between different modes, such as an active mode, one or more calibration modes, and the like. The controller 306 may also be used for sending and receiving instructions, for example from a computer device, to initiate a measurement, to transmit information, and the like. For example, the controller 306 may receive a signal that includes instructions for beginning a measurement operation, which may begin with first calibrating the probe and then obtaining a measurement.

A comparator 308 is also illustrated to compare returning signals against a threshold voltage. For example, if a returned signal exceeds the threshold or is within a designated range or window, the comparator 308 may emit a signal, which may be evaluated by a measurement module 310 to determine the level. It should be appreciated that in various embodiments the comparator 308 and the measurement module 310 may be integrated into a single component. Additionally, in embodiments, the measurement module 310 may be a single component with the timer/counter 304. Furthermore, the determination of the level may be processed at a remote system, such as the vehicle control system, to reduce processing and/or operation at the front end. In operation, the comparator 308 characterizes an impedance change, which is indicative of interaction with the fluid. For example, as noted above, if the system expects a reflected voltage to be approximately 25% (which may be a factor of an impedance difference between the probe in air and the probe in the fluid) of the initial voltage. So for an example transmission of 12V, a return of approximately 3V is expected. As a result, a threshold may be set that includes a range (e.g., above and below the expected return) that is indicative of the expected return voltage that would represent the liquid level. In various embodiments, the threshold may be dynamic, as a threshold that is too high may return voltages that are not indicative of the liquid level and a threshold that is too low may be indicative of noise. Furthermore, the threshold may change over time and may also include time stops or timers to begin and stop recording. For example, over time, it is expected that the level in the tanks will decrease, and as a result, measurements received prior to a certain time may be discarded as noise and/or not reasonably indicative of tank level.

The front end 202 of the illustrated embodiment also includes an input/output interface 312. The interface 312 may include one or more couplings or connectors to operationally connect the probe 204 to the front end 202. In this example, the interface 312 is a two-way interface that enables transmission of information (e.g., voltage) and receipt of information (e.g., reflected voltage). As noted above, in various embodiments, different configurations may block or otherwise restrict certain communications via the interface 312. For example, information from a particular leg may be routed to a predetermined location and not utilized by the front end. Furthermore, multiple connections may enable a plurality of probes that are used with a single front end.

In this configuration, the probe 204 is coupled to the front end 202 and extends for the probe length 208, which may be particularly selected based on expected operating conditions. The probe 204 shown in FIG. 3 includes a connecting region 314 (e.g., first segment) and an extending region 316 (e.g., second segment, a sensor zone). As will be described below, different channels 318 of the connecting region 314, coupled to the front end 202, may be designated for different purposes. By way of example, the connecting region 314 may include a sensing or measurement channel, a calibration channel, and a free channel. Accordingly, a signal transmitted to the sensing channel may travel through the connecting region 314 and along the extending region 316, while in contrast, a signal sent to the calibration channel may remain on the connecting region 314. In this manner, different signal configurations may be used for different purposes. In various embodiments, the channels 318 may include a trace, made from copper, aluminum, or any conductive material, for transmission of the signal. As will be described below, a pattern or channel configuration may be utilized to increase a distance that the signal travels, thereby reducing the likelihood of signal overlap. For example, in various embodiments, a "launch zone" and/or an "end zone" may be incorporated into at least one of the connecting region 314 and the extending region 316. The respective launch or end zones may include a meandering trace. By way of example, a launch zone positioned within the connecting region 314 may prohibit or reduce the likelihood of receiving an erroneous reading from a reflection at the connecting region 314 by providing a distance of travel for the pulse, which may then be gated for the receiver to ignore signals before the end of the launch zone. Similarly, the end zone may be arranged along the extending region 316 to provide additional travel after a signal is received to prevent a fully reflected signal from overwhelming a partially reflected signal.

Figure 4:
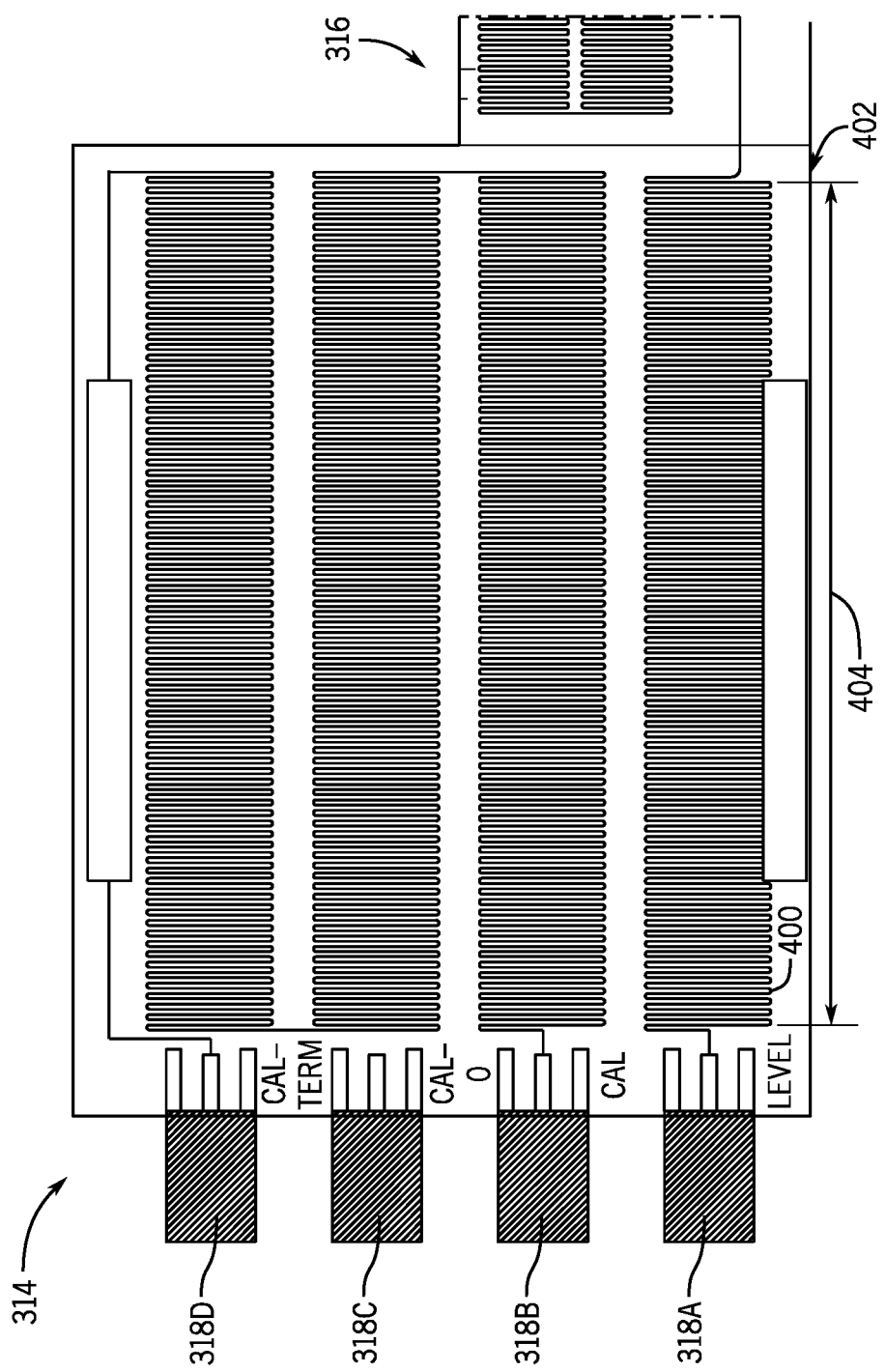
FIG. 4 is a schematic diagram of an embodiment of a connecting region, in accordance with embodiments of the present disclosure.

FIG. 4 is a top plan view of an embodiment of the connecting region 314 including four different channels 318 that may be used for transmitting and/or receiving a signal. It should be appreciated that four channels 318 are shown for illustrative purposes only and that other embodiments may include more or fewer channels. For example, embodiments may include one channel, two channels, three channels, five channels, or any reasonable number of channels.

A first channel 318A may be referred to as a sensing or measurement channel and includes a trace 400 that extends between the connecting region 314 and the extending region 316. As described above, the trace 400 may be formed from a conductive material, such as copper, and in certain embodiments may be thin to provide flexibility to the connecting region 314, which as noted above may be a PCB that is also thin to enable flexibility and reduce overall weight. The illustrated trace 400 may have a configuration 402 referred to as a wave pattern with a short wavelength (e.g., high frequency). In other words, the trace 400 may be a compressed wave pattern. The illustrated trace 400 extends along a connecting region length 404 and is coupled to the interface 312. In operation, a command may be transmitted to send a signal along the first channel 318A, which will travel down the extending region 316 until it contacts the liquid. This contact will lead to a partial reflected pattern to travel back up along the trace 400 and the first channel 318A to provide information to the front end 202, which may be used to determine the liquid level.

As noted herein, the trace 400 for the first channel 318A may be referred to as a launch zone that prevents or reduces a likelihood that an erroneous reflection will be recorded. For example, the pattern of the trace 400 effectively increases a distance of travel (e.g., a trace length is longer than the connecting region length 404). Accordingly, embodiments of the present disclosure overcome problems with existing measurement systems that utilize expensive components to obtain pulses to try to overcome erroneous reflections.

A second channel 318B is illustrated proximate the first channel 318A, but is shown isolated from the first channel 318A. In other words, the second channel 318B is not connected to the first channel 318A in the illustrated embodiment. The second channel 318B may be referred to as a calibration channel and includes a continuous trace 400 that extends along a third channel 318C and a fourth channel 318D. In various embodiments, the channels 318B and 318C may be utilized to perform different calibrations of the probe. By way of example, the second channel 318B may be a calibration channel to calibrate for wavefront velocity on the probe 204. For example, the calibration may be based on a specific length of the trace 400. As another example, the third channel 318 does not include a connection to the probe and may be used to calibrate for wavefront velocity and time of flight across the SumMiniature version A (SMA) connectors of the front end 202. In certain embodiments, the fourth channel 318D may be used as an auxiliary connector to enable coupling to another sensor, provide additional redundancy, or the like.

The illustrated channels 318B-318D include a similar configuration 402 to the first channel 318A with the compressed, high frequency wave. As noted above, such a configuration enables a longer length of trace 400 over a smaller axial distance of the connecting region 314, thereby reducing the likelihood of overlapping signals, among other benefits. In various configurations, the channels 318B-318D are coupled to one another, but it should be appreciated that the channels 318B-318D may be disparate and disconnected.

Application of the connecting region 314 provides numerous advantages and benefits over existing techniques. By way of example, the connecting region 314, in part with other features of the present embodiments, enable accommodation of a destructive interference problem that may be found in traditional techniques. Moreover, additional functionality may also be incorporated to improve accuracy. As an example, embodiments include the connecting region 314 (e.g., a meandering launch zone) that takes up approximately 20 ns of time for an incoming pulse before it reaches the actual measurement zone of the probe (e.g., the sensor portion 316). In embodiments, the timer 304 is particularly selected to disregard or not read reflections for the initial 12 ns of counting. Accordingly, the launch zone provides a buffer so that the time counted by the timer is always in-bounds. Furthermore, the connecting region 314 provides an additional 50 ns buffer at the end, and accordingly, the "large" pulse that typically is reflected and destructively interferes with the signal of interest is not reflected for an additional approximately 100 ns, giving the comparator time to react.

The connecting region 314 further includes a separate calibration lines, such as the channels 318B, 318C. For example, in various embodiments, the "CAL-0" line has no signal line to enable the timer to conclude how much time it takes for a transmitted probe from the front end to reach the probe itself, for calibration purposes. The separate "CAL" line on the same probe may have a particularly selected, known length. Using this fixed distance and the time it takes for a pulse to reach the end and reflect, the system can fully identify the wavefront propagation velocity of pulses. As an example, for a length of approximately 175 inches, v=d/t=175"/treflect)=~0.6 c.

Embodiments of the present disclosure overcome multiple problems with existing time domain reflectometry measurement techniques. For example, when the probe 204 (e.g., the extending region 316) is a single trace, most of the reflections reach the comparator 308 at nearly the same instance (e.g., nanoseconds apart). In other words, an initial reflection from the liquid level is reflected and reaches comparator 308 and then nearly immediately afterwards, an inverted, much larger reflection reflects from the end of the probe and reaches the comparator 308. Being much larger and inverted, it effectively decimates the much smaller signal from the liquid level interface. As noted above, one way to overcome this problem is to utilize larger, more expensive pulse generators 302. By way of example, given a 100 ps wide pulse, the pulse fully hits and is read by the comparator 308 far before the much larger 100 ps pulse reflects and decimates this. This is because the time it takes for the pulses to travel is a few ns, so a 100 ps pulse is not likely to be affected. For a larger pulse, such as approximately 10-30 ns, the partial reflected signal will be decimated. Rather than utilizing higher rise, narrower pulses, which may be challenging and expensive, embodiments of the present disclosure, as discussed herein, add a long path at the end of the probe to extend the time it would take for this pulse to return.

Figure 5:
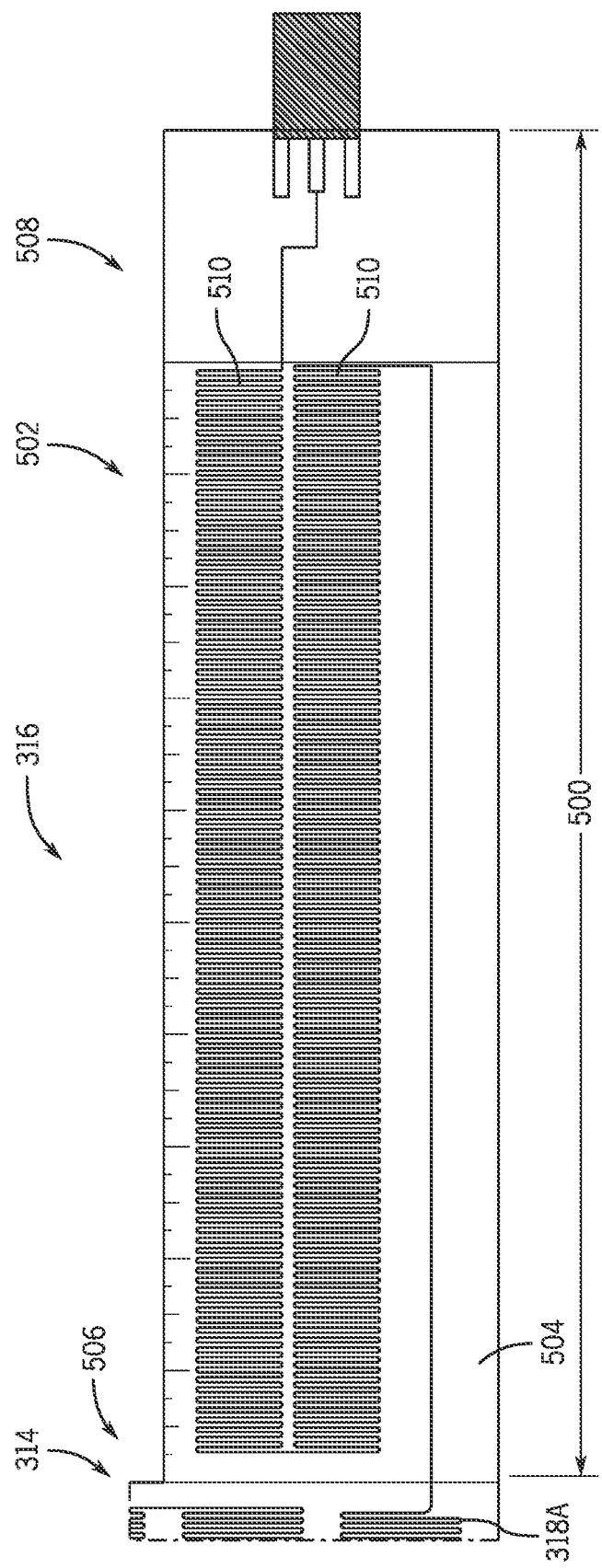
FIG. 5 is a schematic diagram of an embodiment of an extending region, in accordance with embodiments of the present disclosure.

FIG. 5 is a top plan view of an embodiment of the extending region 316 coupled to the connecting region 314 via the trace 400 extending to the first channel 318A. The illustrated extending region 316 extends for an extending region 500, which may be greater than the connecting region length 404. It should be appreciated that the extending region length 500 may be particularly selected based on expected operating conditions. For example, the extending region length 500 may be selected based on a size of the tank, a desired region of detection, and the like. The illustrated configuration 502 includes a lead trace 504, which may also be referred to as a sensing line, that extends from a first end 506 (e.g., proximate the connecting region 314) to a second end 508 (e.g., opposite the connecting region 314). Further illustrated are columns 510 having the configuration 402 (e.g., high frequency wave). These columns 510 may also be referred to as an end zone and include the meandering trace pattern described above with reference to the launch zone. As a result, the effective length of travel for a signal over the entire extending region length 500 is increased, which may be advantageous in various embodiments where full reflections may obscure or otherwise overtake partial reflection signals. It should be appreciated that the two columns 510 are for illustrative purposes and more or fewer columns 510 may be included to adjust the total length of the trace 400.

In operation, a signal will travel through the connecting region 314 and along the lead trace 504. A portion of the extending region 316 may be in contact with a fluid and, when the signal contacts the area in contact with the fluid, a partial reflection may return to the front end 202. As noted above, in various embodiments differences in impedance are evaluated to set thresholds for reading or otherwise regarding signals. The illustrated extending region 316, as well as the entire probe 204, may be manufactured to have a particularly selected impedance. This impedance is dependent on the surroundings of the probe 204. Accordingly, the impedance in air or a gas (e.g., the empty part of the tank) and the impedance in liquid (e.g., the full part of the tank) will be different, and as a result, the reflected partial signal may be anticipated and measured.

Figure 6:
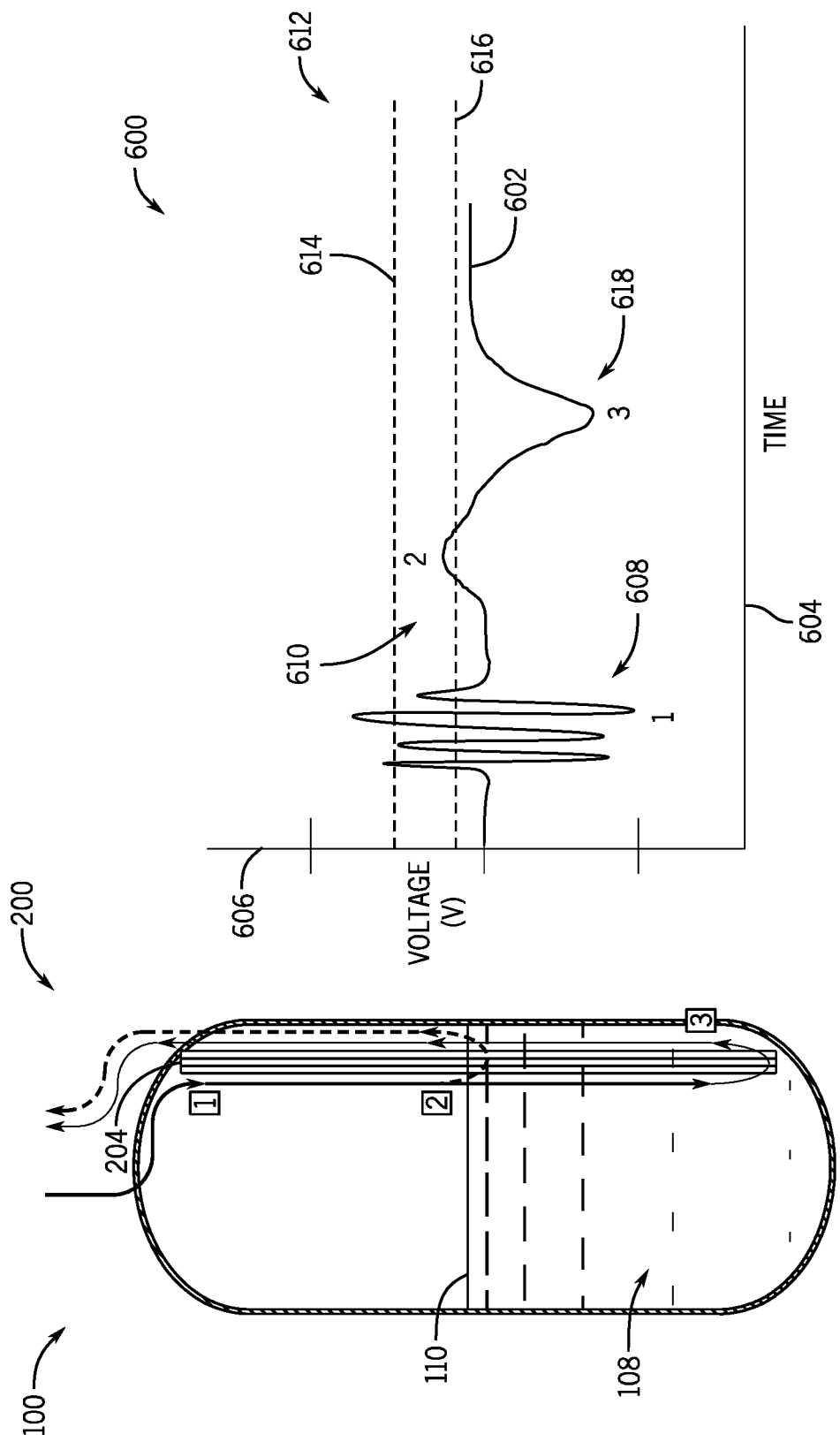
FIG. 6 is a schematic diagram of an embodiment of a fuel tank and associated response, in accordance with embodiments of the present disclosure.

FIG. 6 is a schematic representation 600 of a response 602 responsive to the illustrated tank 100. It should be appreciated that the tank 100 may include one or more features from the tank 100 shown in FIG. 2, including the level sensing system 200. The response 602 is illustrated on a chart that includes an x-axis 604 illustrative of time and a y-axis 606 illustrative of voltage (V).

In this example, an input pulse is provided to the probe 204 (indicated by 1 on the tank 100 and the response 602). As shown, the voltage forms a valley 608 in the negative region for the period of time the pulse is provided, which may be a pulsed square wave, as described above. Thereafter, as the pulse travels along the probe 204, the liquid level 110 is encountered (indicated by 2 on the tank 100 and the signal response 602). A reflected partial response is provided back to the front end, which is indicated at a peak 610.

As described above, an impedance in the probe 204 may be different for the probe in a first medium (e.g., air) and the probe in a second medium (e.g., the fluid 108). Accordingly, an anticipated value of the reflected partial response may be predicted and a gate or threshold 612 may be established, for example at the comparator 308. In this example, the threshold 612 has a high threshold level 614 and a low threshold level 616. Values outside of this level may be discarded.

The remainder of the pulse continues along the probe 204 and reaches the end and provides a fully reflected pulse (indicated by 3 on the tank 100 and the response 602), shown as the valley 618. In various embodiments, a gap between the peak 610 and the valley 618 is desirable to prevent the valley 618 from decimating or otherwise obscuring the peak 610. As noted above, various features of the present embodiment, such as the launch zones and increased length of the trace provide this gap to enable identification of the peak 610. Accordingly, the information from the response 602 may be used to determine the liquid level 110.

Figure 7:
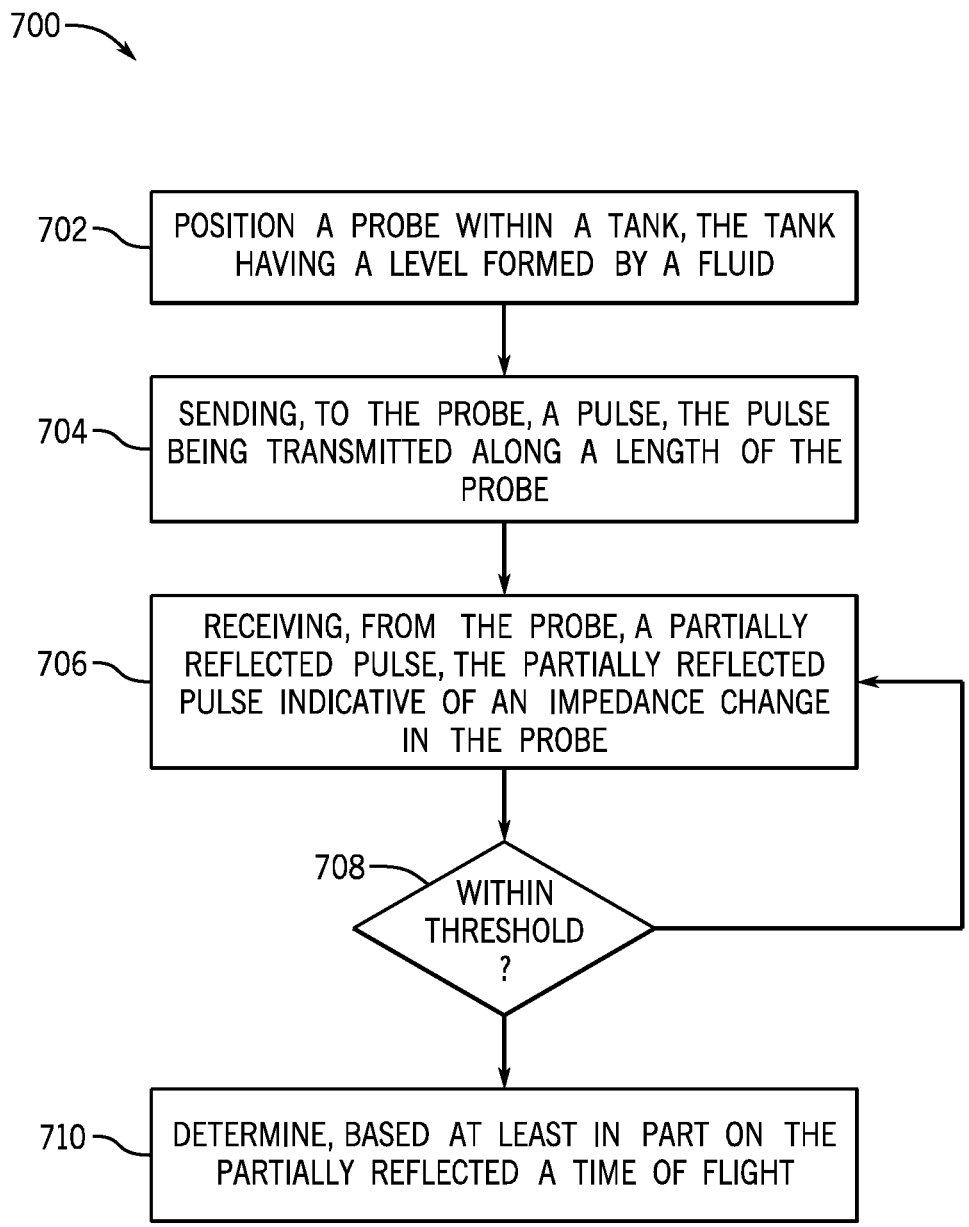
FIG. 7 is a flow chart of an embodiment of method for determining a liquid level, in accordance with embodiments of the present disclosure.

FIG. 7 is a flow chart of an embodiment of a method 700 for determining a liquid level. It should be appreciated that for this method, and all methods described herein, that there may be more or fewer steps. Additionally, the steps may be performed in a different order, or in parallel, unless otherwise specifically stated. Furthermore, various steps of the method may be carried out on a processor in response to instructions stored on machine-readable memory. The processor may receive the instructions from the memory, along with information from various sensors, to execute the instructions to perform one or more steps of the method. In this example, a probe is positioned within a tank 702. The tank may include a fluid (e.g., a gas, liquid, solid, or combination thereof) that includes a level indicative of how full the tank is. In various embodiments, the probe may be a flexible probe that includes a conductive trace, such as a copper trace, for transmission of pulse s along a length of the probe. The probe may include multiple regions, as discussed above, and moreover may have a particularly selected length in order to provide measurement capabilities over substantially the entire tank and/or over certain regions of the tank. Furthermore, in embodiments, the tank is a fuel tank for a launch vehicle and the probe is a lightweight probe.

A pulse (e.g., signal) is transmitted to the probe 704. The pulse may be a square wave that includes a particularly selected voltage and width (e.g., duration). In various embodiments, it may be desirable to generate pulses s that have tall and thin structures. However, as noted above, doing so may be costly or difficult. Embodiments of the present disclosure may utilize pulses with tall and wide structures and incorporate additional features, such as the launch zones described above and increase a trace length, in order to account for the additional pulse duration. The probe receives the pulse, for example along the conductive trace, and transmits the pulse along a length of the probe. In operation, the probe may be designed to have a particular impedance in a particular medium, such as air. As noted above, differences in impedance may facilitate identification of partially reflected peaks.

As the pulse travels along the probe, the pulse may encounter an interface between the first medium and the liquid and at least a portion of the signal is reflected back 706. The reflected pulse may be less than the initial pulse (e.g., have a lower voltage) and may be received before a fully reflected pulse. The partially reflected pulse is evaluated against a threshold 708. For example, an upper threshold and a lower threshold may be established based on an expected value due to the impedance differences between the probe out of and within the fluid. If the pulse is within the threshold, then a fluid level is determined 710. It should be appreciated that the partially reflected pulse itself may not be indicative of the level, but rather, the time of flight of the partially reflected pulse, which in this example is within the threshold, may be utilized to determine the fluid level. If the pulse is not within the threshold, the pulse may be discarded. In this manner, a fluid level may be determined within a tank.

Figure 8:
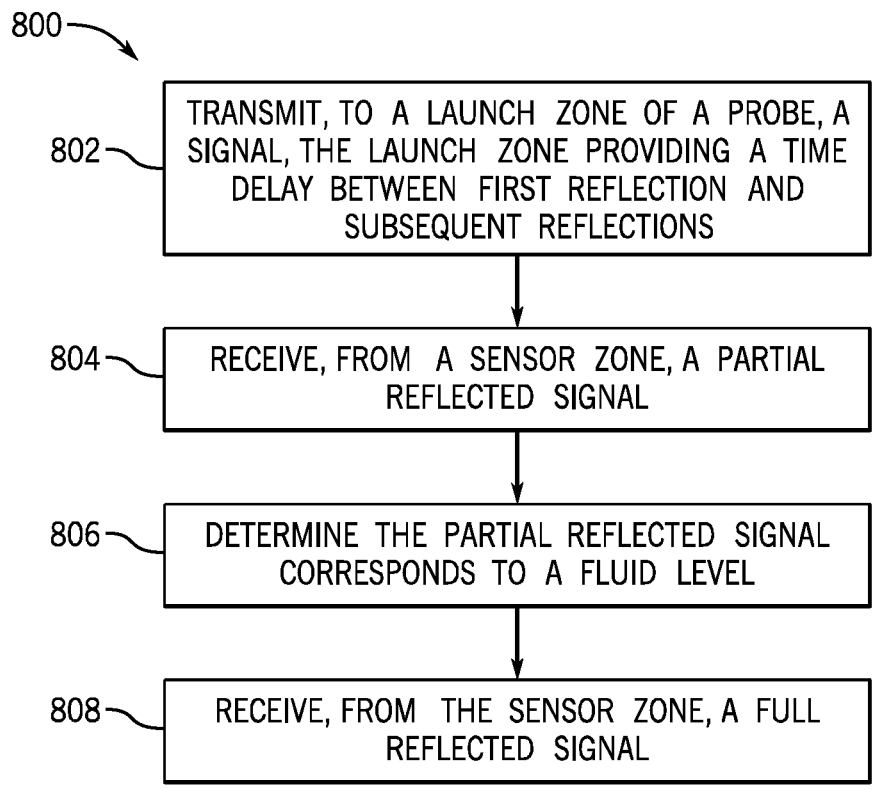
FIG. 8 is a flow chart of an embodiment of method for determining a liquid level, in accordance with embodiments of the present disclosure.

FIG. 8 is a flow chart of an embodiment of a method 800 for determining a fluid level within a tank, such as a fuel tank for a launch vehicle. In this example, a pulse (e.g., signal) is transmitted to a launch zone of a probe 802. As discussed, the launch zone may include a segment of trace that provides a time delay between a first time, corresponding to a time the pulse was transmitted, and a second time, corresponding to a time the pulse reaches a sensor zone (e.g., the extending region 316, the lead trace 504). In various embodiments, the time delay may facilitate use of less sensitive or less expensive components in the system. A partially reflected pulse is received from the sensor zone 804. For example, the pulse may travel along a trace of the sensor zone and contact a fluid level, where the pulse is reflected back. In various embodiments, the pulse is evaluated against a threshold. For example, a pulse value range may be predetermined, and filters or the like may be established to restrict or discard pulses s outside of the range. In various embodiments, the partially reflected pulse is determined to be indicative to a fluid level 806. For example, the pulse may be within the expected range and/or arrive at an anticipated time. A fully reflected pulse is also received from the sensor zone 808. The fully reflected pulse may arrive after the partially reflected pulse, and in various embodiments, additional trace may be added to an end of the sensor zone in order to increase the time of arrival for the fully reflected pulse, thereby reducing the likelihood of losing the partially reflected pulse, which may be smaller than the fully reflected pulse.

Figure 9:
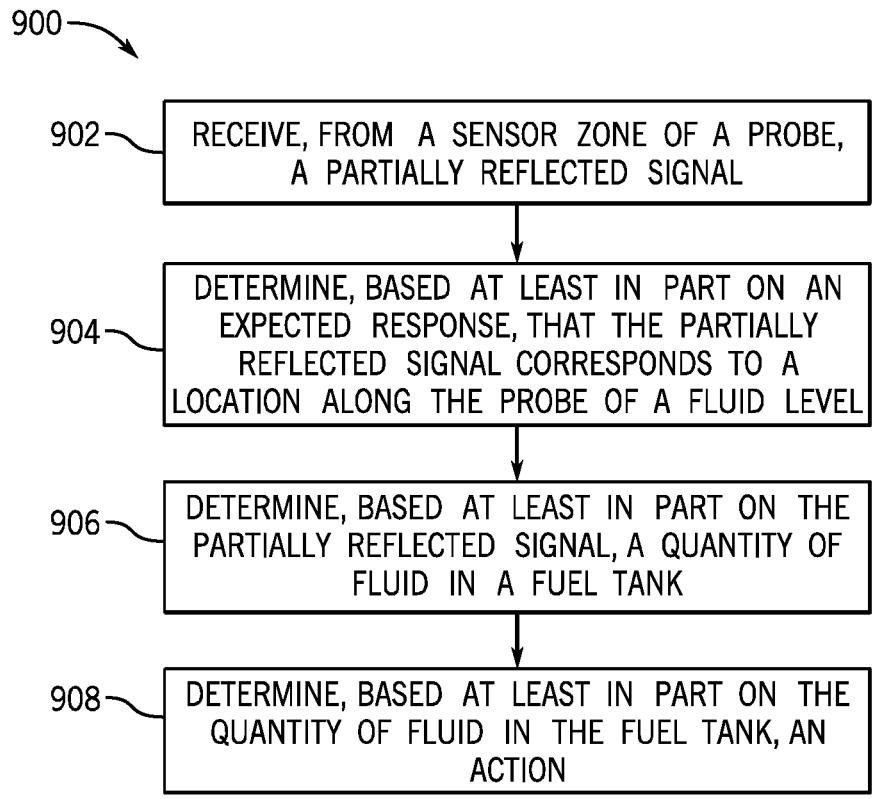
FIG. 9 is a flow chart of an embodiment of method for determining a quantity of fluid in a tank, in accordance with embodiments of the present disclosure.

FIG. 9 is a flow chart of an embodiment of a method 900 for determining and responding to a quantity of fluid in a fuel tank. In this example, a partially reflected pulse (e.g., signal) is received from a sensor zone of a probe 902. For example, the partially reflected pulse may be an electrical pulse reflected along a conductive trace positioned in fluid contact within the fuel tank. The partially reflected pulse may be determined to correspond to a location along the probe of the fluid level 904. That is, the pulse may be utilized to determine the time of flight, which may be correlated to the location along the probe and corresponding fluid level. For example, a voltage of the partially reflected pulse may be evaluated for one of quantity, position, time of receipt, or the like to determine whether the pulse is indicative of the location along the probe of the fluid level. Upon determining the pulse is indicative of the location along the probe of the fluid level, a quantity of fuel in a fuel tank is determined 906. For example, a remaining volume of fuel may be calculated, for example by determining a time of flight between the initial signal and the partially reflected signal. Thereafter, an action may be determined based on the remaining quantity of fuel 908. For example, a refueling procedure may be initiated. Additionally, one or more operational parameters may be adjusted, such as reducing a speed or altitude. In this manner, flight operations may be modified responsive to remaining fuel quantities.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A fluid level detection system, comprising:
a probe, the probe including a conductive trace extending along at least a portion of the probe, the probe being positioned within an interior of a tank, the tank containing a fluid with a level, and at least a portion of the probe being in contact with the fluid;
a pulse generator, the pulse generator adapted to supply a pulse to the probe for transmission along the conductive trace;
a timer, the timer adapted to identify a first time, corresponding to a transmission time of the pulse, and a second time, corresponding to a receipt time of a reflected pulse; and
a comparator, the comparator adapted to receive at least the reflected pulse from the probe and to determine a value for the reflected pulse; and
a connecting region forming at least a portion of the probe, the connecting region including a plurality of channels to separately receive the pulse from the pulse generator, the plurality of channels including at least a measurement channel and a first calibration channel, the first calibration channel being disconnected from the measurement channel so that when the pulse is transmitted to the measurement channel the pulse is isolated from the first calibration channel, and wherein the measurement channel includes a launch zone corresponding to a trace pattern having a longer length than a connecting region length to provide a time delay between transmission of the pulse and entry of the pulse at the probe.

2. The fluid level detection system of claim 1, further comprising:
a second calibration channel; and
an auxiliary channel.

3. The fluid level detection system of claim 1, wherein the probe comprises:
an extending region, wherein
the connecting region is arranged between the pulse generator and the extending region.

4. The fluid level detection system of claim 3, wherein the extending region comprises:
a lead trace extending from a first end to a second end, the lead trace coupling the extending region to the connecting region; and
one or more columns extending along an extending region length, the one or more columns having a compressed configuration increasing an effective length of the conductive trace.

5. The fluid level detection system of claim 1, wherein the probe is formed on a printed circuit board.

6. The fluid level detection system of claim 1, wherein the pulse generator produces a square wave.

7. A method for determining a fluid level, comprising:
transmitting, to a first portion of a probe, a pulse;
directing the pulse, along a measurement channel disconnected from a calibration channel, to a second portion of the probe, the second portion being electrically coupled to the first portion, wherein a time period of the pulse in the first portion is increased by a trace pattern of the measurement channel;

receiving, from the second portion of the probe, a partially reflected pulse, the partially reflected pulse being indicative of a property change for at least a portion of the probe;

determining the partially reflected pulse satisfies a threshold; and determining, based at least in part on the partially reflected pulse, the fluid level.

8. The method of claim 7, further comprising:
directing the pulse to a first channel of the first portion.

9. The method of claim 8, further comprising:
directing the pulse to a second channel of the first portion; and determining, based at least in part on a second channel response, wavefront propagation velocity.

10. The method of claim 7, further comprising:
determining a pulse value;
determining, based at least in part on the property change, an expected partially reflected pulse value; and
adjusting the threshold, based at least in part on the expected partially reflected pulse value.

11. The method of claim 7, wherein the threshold comprises an upper level and a lower level.

12. The method of claim 7, wherein the property change corresponds to an impedance change.

13. The method of claim 7, wherein the pulse is a square wave.

14. The method of claim 7, further comprising:
receiving, from the second portion of the probe, a fully reflected pulse, the fully reflected pulse being received after the partially reflected pulse.

15. A fluid level detection system, comprising:
a measurement probe, comprising:
  a launch zone, the launch zone having a launch zone length including a first portion of a conductive trace, the launch zone arranged to provide a time delay;
  a lead trace, coupled to the launch zone, the lead trace having a lead trace length including a second portion of the conductive trace; and
  a plurality of channels, including at least a measurement channel and a first calibration channel, the first calibration channel being disconnected from the measurement channel; and
a front end, the front end configured to transmit a pulse, to the measurement probe, and receive one or more reflected pulses in response to the pulse, the front end comprising:
  a pulse generator to transmit the pulse to the measurement probe; and
  a timer to record one or more indicators corresponding to a pulse transmission and a reflected pulse receipt.

16. The fluid level detection system of claim 15, wherein the launch zone forms at least a portion of a connecting region
and each channel of the plurality of channels is coupled to direct the pulse along a respective section of conductive trace.

17. The fluid level detection system of claim 15, further comprising:
a comparator configured to receive the one or more indicators and determine, based at least in part on the one or more indicators, whether the one or more reflected pulses correspond to a partial reflected pulse or a fully reflected pulse.

18. The fluid level detection system of claim 17, wherein a partial reflected pulse has a lower value than a fully reflected pulse.

19. The fluid level detection system of claim 15, wherein the pulse is a square wave having a duration between 10 and 30 ns.

20. The fluid level detection system of claim 15, wherein the measurement probe is a flexible probe formed on a printed circuit board.

* * * * *